United States Patent
Mihayashi et al.

(10) Patent No.: US 6,326,409 B1
(45) Date of Patent: Dec. 4, 2001

(54) IN-MOLD FOAMING ARTICLE OF POLYPROPYLENE RESIN COMPOSITION

(75) Inventors: Tsuyoshi Mihayashi; Yutaka Yanagihara; Takayuki Goda, all of Settsu (JP)

(73) Assignee: Kaneka Corporation, Osaka (JP)

(*) Notice: Subject to any disclaimer, the term of this patent is extended or adjusted under 35 U.S.C. 154(b) by 0 days.

(21) Appl. No.: 09/694,264

(22) Filed: Oct. 24, 2000

(30) Foreign Application Priority Data

Nov. 5, 1999 (JP) .................................................. 11-315021

(51) Int. Cl.$^7$ ....................................................... C08J 9/22
(52) U.S. Cl. ................................ 521/58; 521/59; 521/134
(58) Field of Search ................................. 521/58, 59, 134

(56) References Cited

U.S. PATENT DOCUMENTS

| | | | |
|---|---|---|---|
| 4,830,798 | 5/1989 | Maeda | 264/50 |
| 5,821,272 | * 10/1998 | Ochlkoshi et al. | 521/58 |
| 5,883,141 | * 3/1999 | Mihayashi et al. | 521/58 |
| 5,942,551 | * 10/2000 | Mihayashi et al. | 521/58 |
| 6,130,266 | * 10/2000 | Mihayashi et al. | 521/58 |
| 6,214,896 | * 4/2001 | Mogaami et al. | 521/134 |

FOREIGN PATENT DOCUMENTS

| | | |
|---|---|---|
| 0 934 974 | 8/1999 | (EP) . |
| 1 016 690 | 7/2000 | (EP) . |

* cited by examiner

*Primary Examiner*—Morton Foelak
(74) *Attorney, Agent, or Firm*—Armstrong, Westerman, Hattori, McLeland & Naughton, LLP

(57) ABSTRACT

The object of the present invention is to provide an in-mold foaming article of a propylene resin composition having improved productivity and stable quality in internal molding, and simultaneously a compressive strength and a tensile strength thereof at high density range are improved at the same time. The in-mold foaming article is obtained by using a pre-foamed particle having a density of 90 to 300 g/L and an open cell ratio of at most 12%, wherein the pre-foamed particle comprises a resin composition having (A) 100 parts by weight of a polypropylene resin and (B) 0.01 to 20 parts by weight of a hydrophilic polymer as a base material resin, and water as a foaming agent, the pre-foamed particle having at least two endothermic peaks in a DSC curve obtained in differential scanning calorimetry.

4 Claims, No Drawings

IN-MOLD FOAMING ARTICLE OF POLYPROPYLENE RESIN COMPOSITION

BACKGROUND OF THE INVENTION

The present invention relates to an in-mold foaming article of a polypropylene resin composition which is foamed in mold, and used for insulation materials, cushioning packing materials, delivery boxes; automobile parts such as a bumper core material, pillar, platform, and side projection material; pallet materials, tool boxes and the like. More particularly, the present invention relates to an in-mold foaming article of a polypropylene resin composition which is foamed in mold having high density and excellent in both mechanical strength properties of compressive strength and tensile strength.

A foamed article of a polypropylene resin is excellent in chemical resistance, heat resistance, strain recovering property after compression and the like compared to polystyrene resin foamed article, and widely used for cushioning packing materials, delivery boxes; automobile parts such as a bumper core material, pillar, platform, and side projection material; pallet materials, tool boxes and the like.

Conventionally, for production of a polypropylene resin pre-foamed particle giving the a polypropylene resin foamed article, there have been used volatile foaming agents typically including hydrocarbon foaming agents such as CFC-12, HCFC-22, HCFC-142b, and HFC-134a; hydrocarbon foaming agents such as propane, butane, and pentane. However, since any of these agents cause global environmental problems such as decomposition of the ozone layer and globe temperature rising, and safety problems inevitably occurring due to inflammability thereof, there have been recently used inorganic gas foaming agents such as a nitrogen gas, air, carbon dioxide gas for necessity of countermeasures against such problems (for example, Japanese Unexamined Patent Publication Nos. 6-192462/1994, 7-173321/1995, 8-259724/1996 and the like). Among them, particularly when a carbon dioxide gas is used as a foaming agent, this gas has excellent compatibility with a polypropylene resin and production of a pre-foamed particle having desired physical properties and of an internal foamed article comprising the particle is relatively easy. Therefore, there are widely known arts regarding a polypropylene resin pre-foamed particle obtained by using a carbon dioxide gas as a foaming agent and a foamed article comprising the particle.

By the way, it is also well known that a carbon dioxide gas is a cause of global temperature rising, and in arts using an inorganic gas foaming agent, the above-mentioned global environmental problems are not yet solved to date.

In view of such current conditions, investigations regarding selection of foaming agents for also solving global environmental problems have been conducted. And development of a polypropylene resin pre-foamed particle obtained by using, as a forming agent, water which had not been admitted as a foaming agent at all, and development of a foamed article comprising the particle have become successful and a lot of applications have been filed until now (for example, Japanese Unexamined Patent Publication Nos. 10-245437/ 1998, 11-21368/ 1999, 11-100458/1999 and the like).

Any of these arts is an epoch-making art giving a polypropylene resin pre-foamed particle unharmful to global environment and an internal foamed article comprising this particle, which can completely solve the above-mentioned problems.

Among other, an art described in Japanese Unexamined Patent Publication No. 11-100458/1999, for example, has an excellent feature which reverses conventional common knowledge in foamed articles using a polypropylene resin as a base material resin. Under this feature, tensile strength can be kept high even if fusion ratio of a foamed article is at most 70% which can not conventionally be imagined. And resultantly, improvement in productivity in internal molding and stability of quality can be attained simultaneously while maintaining the quality of the foamed article at the same level or more.

SUMMARY OF THE INVENTION

Then, the present inventors have intensively continued studying to further improve degree of completion of an art for preparing a foamed article having such an excellent feature, and resultantly found that not only tensile strength but also compressive strength can be improved when open cell ratio of a foamed article is at most 12%. Further, the present inventors have found that this effect is remarkable in high density range of at least 90 g/L to complete the present invention.

Namely, the present invention relates to an in-mold foaming article of propylene resin composition having a density of 90 to 300 g/L and an open cell ratio of at most 12% obtained by using a pre-foamed particle, wherein the pre-foamed particle comprises a resin composition containing (A) 100 parts by weight of a polypropylene resin and (B) 0.01 to 20 parts by weight of a hydrophilic polymer as a base material resin, and water as a foaming agent, and the pre-foamed particle has at least two endothermic peaks in a DSC curve obtained in differential scanning calorimetry.

In the above-mentioned in-mold foaming article, a fusion ratio is preferably 10 to 70%.

In the above-mentioned in-mold foaming article, a tensile strength is 0.6 to 3.0 MPa, and a density x and a compressive strength y satisfy the following formula (1):

$$y - 0.013x + 0.645 \geq 0 \qquad (1)$$

DETAILED DESCRIPTION

The in-mold foaming article of the present invention uses, as a raw material, a pre-foamed particle comprising a resin composition having (A) 100 parts by weight of a polypropylene resin and (B) 0.01 to 20 parts by weight of a hydrophilic polymer as a base material resin, and water as a foaming agent, wherein the pre-foamed particle has at least two endothermic peaks in a DSC curve obtained in differential scanning calorimetry.

The above-mentioned polypropylene resin is a component used for obtaining a pre-foamed particle having excellent balance in foamability, moldability, and mechanical strength, heat-resistance and flexibility of the resulting in-mold foaming article. Further, the above-mentioned hydrophilic polymer is a component used for preparing a pre-foamed particle having desired physical properties by using water as a foaming agent.

The above-mentioned polypropylene resin is preferably a resin comprising 92 to 100% by weight, particularly 92 to 99.95% by weight of a propylene monomer unit, and 0 to 8% by weight, particularly 0.05 to 8% by weight of a monomer unit copolymerizable therewith. When the propylene monomer unit is contained in an amount of at least 92% by weight, a foamed article is obtained having excellent mechanical strength, processability, electric insulation property, water-resistance and chemical-resistance. The monomer unit copolymerizable with the propylene monomer unit is a component used for improving foamability, moldability, fusion property, flexibility, adhesion property, transparency, impact-resistance, gas barrier property and the like. For obtaining the effect of use thereof, it is preferable to use the monomer unit in an amount of at least 0.05% by weight, particularly at least 0.1% by weight.

Examples of the above-mentioned monomer copolymerizable with the propylene monomer unit are α-olefin monomers having 2 to 8 carbon atoms such as ethylene, butene, pentene, hexene, heptene and octene; cyclic olefins such as norbornene monomers; vinyl alcohol esters such as vinyl acetate; alkyl (meth)acrylates having 1 to 6 carbon atoms in an alkyl group such as methyl methacrylate, ethyl acrylate and hexyl acrylate; vinyl alcohol; methacrylic acid; vinyl chloride and the like. Among them, ethylene is preferable from the viewpoint of excellent balance in foamability, moldability, fusion property, mechanical strength, heat-resistance and flexibility of the resulting in-mold foaming article. These may be used solely or in a combination use of two or more thereof.

A melt index (MI) of the above-mentioned polypropylene resin is, for example in case of an ethylene-propylene random copolymer, preferably 0.2 to 50 g/10 minutes, more preferably 1 to 30 g/10 minutes. A melting temperature is, for example in case of an ethylene-propylene random copolymer, 125 to 165° C., preferably 135 to 165° C., more preferably 140 to 155° C. When MI is less than 0.2 g/10 minutes, a melt viscosity is too high and secondary foaming force decreases, therefore, it is necessary to set a high molding temperature in internal molding. On the other hand, when MI is more than 50 g/10 minutes, there are tendencies that melt viscosity is lower relative to the elongation of a resin at foaming and at internal molding and that open cell ratio increases. Further, when the above-mentioned melting temperature is more than 165° C., the fusion property and secondary foaming force are deficient at molding. On the other hand, when the melting temperature is lower than 125° C., the heat-resistance tends to be deficient.

The melting temperature of a resin in the present invention indicates a peak temperature of an endothermic peak of a DSC curve obtained in the second temperature raising run when the temperature of the resin is raised from 40° C. to 220° C. at a temperature raising rate of 10° C./minute, then, the resin is cooled to 40° C. at the same rate, and further, the temperature of the resin is raised to 220° C. at the same rate. Usually, the equivalent peak temperature is also shown when a pre-foamed particle giving a foamed article is peeled off from the foamed article and the same measurement is carried out by a differential scanning calorimeter.

Examples of the above-mentioned polypropylene resin include a random copolymer of ethylene and propylene, a random terpolymer of ethylene, propylene and butene, a block copolymer of polyethylene and polypropylene, homopolypropylene and the like. The above polypropylene resin may be used in non-crosslinked condition, and may also be crosslinked by a peroxide, radiation and the like. These polymers may be used solely or in a combination use of two or more thereof. Among them, a random copolymer of ethylene and propylene and a terpolymer of ethylene, propylene and butene are preferable from the viewpoint that an in-mold foaming article having excellent balance in mechanical strength, heat-resistance and flexibility is easily obtained from them.

The above-mentioned hydrophilic polymer (B) means a polymer having a water absorption measured according to ASTM D570 of at least 0.5% by weight and it includes what is called a hygroscopic polymer, a water absorbing polymer (water-insoluble polymer which absorbs several-fold to several hundreds-fold water on self weight and is not easily dehydrated even under pressure) and water-soluble polymer (polymer which is dissolved in water at a normal temperature or a high temperature). The molecule of the above-mentioned hydrophilic polymer may contain a hydrophilic group such as a carboxyl group, a hydroxyl group, an amino group, an amide group, an ester group, a polyoxyethylene group or the like.

Examples of the above-mentioned hygroscopic polymer are carboxyl group-containing polymers, polyamides, thermoplastic polyester elastomers, cellulose derivatives and the like.

Examples of the above-mentioned carboxyl group-containing polymer are a terpolymer of ethylene, acrylic acid and maleic anhydride (water absorption: 0.5 to 0.7% by weight); ionomer resins (water absorption: 0.7 to 1.4% by weight) obtained by converting a carboxylate group of an ethylene-(meth)acrylic acid copolymer into a salt with an alkali metal ion such as a sodium ion or potassium ion to crosslink the molecules; a copolymer of ethylene and (meth) acrylic acid (water absorption: 0.5 to 0.7% by weight), and the like. These may be used solely or in a combination use of two or more thereof. Among these carboxyl group-containing polymers, ethylene ionomers obtained by crosslinking an ethylene-(meth)acrylic acid copolymer with an alkali metal ion such as a sodium ion or potassium ion is particularly preferable from the viewpoint of excellent dispersibility in a polypropylene resin.

Examples of the above-mentioned polyamide are nylon-6 (water absorption: 1.3 to 1.9% by weight), nylon-6,6 (water absorption: 1.1 to 1.5% by weight), copolymerized nylon (available from EMS-CHEMIE AG, trade name; GRYLTEX and the like) (water absorption: 1.5 to 3% by weight), and the like. These may be used solely or in a combination use of two or more thereof.

Examples of the above-mentioned thermoplastic polyester elastomer are block copolymers (water absorption: 0.5 to 0.7% by weight) of poly(ethylene terephthalate) and poly (tetramethylene glycol), and the like. These may be used solely or in a combination use of two or more thereof.

Examples of the above-mentioned cellulose derivative are cellulose acetate, cellulose propionate, and the like. These may be used solely or in a combination use of two or more thereof.

Examples of the above-mentioned water absorbing polymer are crosslinked polyacrylate salt polymers, a graft copolymer of starch and acrylic acid, crosslinked poly(vinyl alcohol), crosslinked poly(ethylene oxide), a copolymer of isobutylene and maleic acid, and the like. These may be used solely or in a combination use of two or more thereof.

Examples of the above-mentioned crosslinked polyacrylate salt polymer are crosslinked sodium polyacrylate polymers such as AQUALIC available from Nippon Shokubai Co., Ltd. and DIAWET available from Mitsubishi Chemical Corporation, and the like. These may be used solely or in a combination use of two or more thereof.

Examples of the above-mentioned crosslinked poly(vinyl alcohol) are various crosslinked poly(vinyl alcohol) typically including AQUARESERVE available from Nippon Synthetic Chemical Industry Co., Ltd., and the like. These may be used solely or in a combination of two or more thereof.

Examples of the above-mentioned crosslinked poly (ethylene oxide) are various crosslinked poly(ethylene oxide) such as AQUACOKE available from Sumitomo Seika Chemicals Co., Ltd., and the like. These may be used solely or in a combination use of two or more thereof.

Examples of the above-mentioned copolymer of isobutylene and maleic acid are various copolymers of isobutylene and maleic acid typically including KI gel available from Kuraray Co., Ltd., and the like. These may be used solely or in a combination use of two or more thereof.

Examples of the above-mentioned water-soluble polymer are poly(meth)acrylic acid, poly(meth)acrylate salt polymers, poly(vinyl alcohol), poly(ethylene oxide), water-soluble cellulose derivatives, and the like. These may be used solely or in a combination of two or more thereof.

Examples of the above-mentioned poly(meth)acrylic acid are poly(acrylic acids), a copolymer of acrylic acid and ethyl acrylate, 2-poly(hydroxyethyl methacrylate), and the like. These may be used solely or in a combination use of two or more thereof.

Examples of the above-mentioned poly(meth)acrylate salt are sodium polyacrylate, sodium polymethacrylate, potassium polyacrylate, potassium polymethacrylate, and the like. These may be used solely or in a combination use of two or more therof.

Examples of the above-mentioned poly(vinyl alcohol) are poly(vinyl alcohol), a copolymer of vinyl alcohol and vinyl acetate, and the like. These may be used solely or in a combination use of two or more thereof.

Examples of the above-mentioned poly(ethylene oxide) are poly(ethylene oxide) having a molecular weight of several ten thousand to several millions, and the like. These may be used solely or in a combination use of two or more therof.

Examples of the above-mentioned water-soluble cellulose derivative are carboxymethylcellulose, hydroxyethylcellulose and the like. These may be used solely or in a combination use of two or more thereof.

The hygroscopic polymer, the water-absorbing polymer and the water-soluble polymer may be used solely or in a combination use of two or more thereof.

An amount of the above-mentioned hydrophilic polymer is at least 0.01 part by weight, preferably at least 0.05 part by weight based on 100 parts by weight of a polypropylene resin, though it differs depending on the kind of the hydrophilic polymer. Also, the amount is at most 20 parts by weight, preferably at most 10 parts by weight, more preferably at most 5 parts by weight from the viewpoint to improve production stability and foamability in preparing a pre-foamed particle, to impart excellent mechanical strength and heat resistance to a foamed article and to lower dimension change in water absorption.

The polypropylene resin composition of the present invention preferably contain a filler since a pre-foamed particle having closed cells of uniform cell size can be obtained. As the filler, an inorganic filler or an organic filler is listed, and both of them may be used simultaneously.

Examples of the inorganic filler are talc, mica, kaolin, clay, silica, calcium carbonate, aluminum oxide, titanium oxide, calcium hydroxide, aluminum hydroxide, borax, zeolite, diatomaceous earth, wollastonite, micro balloon, and the like. Among them, talc is preferable from the viewpoint that a pre-foamed particle having closed cells of uniform cell size is easily obtained.

The above-mentioned organic filler is not particularly limited, as long as it remains solid at a temperature of at least the softening temperature of the polypropylene resin.

Examples of the organic filler are fluoro resin powders such as polytetrafluoroethylene, silicone resin powders, thermoplastic polyester resin powders and the like.

The above-mentioned fillers may be used solely or in a combination use of two or more thereof.

An average particle size of the above-mentioned filler is preferably at most 50 $\mu$m, more preferably at most 20 $\mu$m from the viewpoint that there can be obtained a pre-foamed particle having uniform cell size and relatively high foaming ratio, and an in-mold foaming article having excellent mechanical strength and flexibility therefrom. Also, the average particle size is preferably at least 0.1 $\mu$m, more preferably at least 0.5 $\mu$m from the viewpoint of secondary coagulation and handling processability.

When the above-mentioned filler is used, an amount thereof is preferably at least 0.001 part by weight, more preferably at least 0.005 part by weight, and at most 3 parts by weight, more preferably at most 2 parts by weight based on 100 parts by weight of a polyolefin resin.

Further, the polypropylene resin composition can contain, if necessary, organic pigments such as azo, phthalocyanine, quinacridone, perylene, perynone, anthraquinone, thioindigo, dioxazine, isoindolinone and quinophthalone; inorganic pigments such as carbon black, Ketjen black, iron black, cadmium yellow, cadmium red, cobalt violet, cobalt blue, iron blue, ultramarine, yellow lead, zinc yellow and barium yellow; and additionally, also various additives such as a dye, antistatic agent, antioxidant, light stabilizer, lubricant and the like.

The above-mentioned polypropylene resin composition containing the polypropylene resin, the hydrophilic polymer, and if necessary, fillers, various additives and the like is preferably melt-kneaded usually by using an extruder, a kneader, a Banbury mixer, a roll and the like, then, molded into desired particle form which is easily utilized for pre-foaming such as cylindrical form, ellipse cylindrical form, spherical form, cubic form, rectangular parallelepiped and the like. Conditions of preparing the above-mentioned particle and the size of the resin particle are not also particularly limited, for example, a particle obtained by melt-kneading in an extruder usually has 0.5 to 10 mg/particle.

The above resin particles comprise as a pre-foaming particles 0.5 to 50% by weight, preferably 0.5 to 30% by weight of water as a foaming agent based on 100 parts by weight of the resin particles. If the amount is less than 0.5% by weight, it tends to be difficult to foam. On the other hand, if the amount is more than 51% by weight, an open cell ratio of the foamed pre-foamed particles tends to become high.

Pre-foaming can be conducted, for example, by the following method. A sealed vessel is charged with the above-mentioned resin particle and water, and additionally if necessary, dispersing agents such as calcium tertiary phosphate, sodium n-parafinsulfonate and the like. After the mixture is heated, air is introduced into the sealed vessel to press the inside of the sealed vessel. A bulb of this sealed vessel is opened while maintaining this pressure to release the water-dispersion substances (resin particle and aqueous dispersing medium) into atmospheric pressure. A heating temperature of the sealed vessel is preferably from a melting temperature of the composition to the temperature +20° C. If the heating temperature is less than the melting temperature, it becomes difficult to foam. On the other hand, if the heating temperature is more than the temperature +20° C., mechanical strength and thermal resistance become insufficient and the resin particles are easily fused in the vessel. Also, a pressure is preferably 686000 to 7448000 Pa.

If the pressure is less than 686000 Pa, it becomes difficult to foam. On the other hand, if the pressure is more than 7448000 Pa, an open cell ratio of the foamed pre-foamed particles tends to become high.

A DSC curve in differential scanning calorimetry means a DSC curve obtained when 1 to 10 mg of a pre-foamed particle giving a foamed article of polypropylene resin composition is heated from 40° C. to 220° C. at a heating rate of 10° C./minute by using a differential scanning calorimeter.

In case of a DSC curve of a pre-foamed particle having, as a base material resin, a polypropylene resin composition giving the foamed article of the present invention, at least two endothermic peaks are observed. This mainly reflects a heat history which has been experienced theretofore by a pre-foamed particle giving a foamed article, though a pattern differs depending on a composition and preparation method of a pre-foamed particle giving a foamed article or a molding method of a foamed article. For example, it is widely known that a pre-foamed particle having two endothermic peaks can be obtained by setting foaming conditions carefully in preparing a non-crosslinked polyolefin resin pre-foamed particle. By introducing this art, excellent internal moldability can be imparted. Usually, when the above-mentioned pre-foamed particle having two endothermic peaks is subjected to internal molding, two endothermic peaks, or three endothermic peaks depending on a molding and agent condition appear also in a DSC curve of a pre-foamed particle giving the resulted foamed article.

A pre-foamed particle comprising a polypropylene resin composition having such physical property is filled in a mold which can be closed but not be sealed, and the particle is thermally fused by water vapor and the like, to obtain the in-mold foaming article of a polypropylene resin composition of the present invention.

The heat-fusion molding method of a polyolefin resin pre-foamed particle is conventionally known, and largely classified into three kinds of molding methods, a compression filling molding method, internal pressure imparting method, and direct filling method.

The above-mentioned compression filling molding method is a method in which a pre-foamed particle pre-heated, if necessary, to a room temperature to about 100° C. before being filled in a mold is charged into a pressure-resistant vessel heated to the equivalent temperature to that of the pre-foamed particle, and usually, air of about 50 to 500 kPa is introduced to compress the pre-foamed particle by pressure to allow the particle be filled into the mold quickly and the pre-foamed particle is heat-fused.

In the above-mentioned internal pressure imparting method, a pre-foamed particle is usually left for at least 10 minutes while heating and maintaining the particle at 40 to 100° C., if necessary, in a air tight vessel pressed usually with air and the like to about 50 to 600 kPa, before initiation of molding. The pre-foamed particle is impregnated with air and the like by this procedure, then, removed from the air-tight vessel, and quickly filled into a mold. While the compression filling method allows a pre-foamed particle to be left in an air-tight vessel for a short period (usually from 3 to 30 seconds) for the purpose of compressing the pre-foamed particle, the internal pressure imparting method has a feature that a pre-foamed particle is left for a long period for the purpose of impregnating the pre-foamed particle with air and the like.

The direct filling method is a method in which a pre-foamed particle is directly filled into a mold without conducting the pre-treatment on the pre-foamed particle as in the compression filling method and internal pressure imparting method.

Any of these molding methods, in which a pre-foamed particle is filled into a mold which can be closed but not be sealed, and heat-fused by water vapor, can be applied as a method for obtaining a foamed article of the present invention. In this case, the molding temperature is usually controlled by vapor pressure in a mold at heat-fusing. In case of a polypropylene resin pre-foamed particle, the vapor pressure in a mold is usually set at about 200 to 500 kPa depending on crystal property of the resin or the resin composition. The vapor pressure in a mold affects the open cell ratio of the resulting foamed article. When the pressure is too low, space is formed between the pre-foamed particles giving the resulting foamed article. On the other hand, when the pressure is too high, the open cell ratio of the foamed article tends to increase in any case since the cell of the pre-foamed particle breaks.

In general, if a foamed article is prepared by using the internal pressure imparting method and direct filling method, concave and convex molds are not closed and a slight clearance called cracking is present at filling a pre-foamed particle in many cases. Since the concave and convex molds are required to be closed completely in heating by vapor, usually the clearance becomes 0, namely, the concave and convex molds are closed completely after completion of filling of a pre-foamed particle into a mold. Therefore, the density of the resulting foamed article can be controlled to a certain degree by controlling the size of the above-mentioned clearance.

In preparation of a foamed article in the present invention, when molding is conducted by using a pre-foamed particle comprising a resin composition containing 2 parts by weight of an ethylene ionomer, 0.3 part by weight of talc and 1 part by weight of carbon black based on 100 parts by weight of a random copolymer of ethylene and propylene having a melting temperature of 145° C. (referring to Examples), vapor pressure in a mold required for controlling the open cell ratio of the foamed article to at most 12% and the fusion ratio of the foamed article to 10 to 70% is usually 250 to 450 kPa, which differs depending on the melting temperature and the like of a polypropylene resin composition.

However, in the present invention, since a foamed article having excellent physical property is obtained even if the fusion ratio of the resulting in-mold foaming article is low, internal pressure can be reduced in the internal pressure imparting method and compression ratio can be reduced in the compression filling method. Further, in any of the three kinds of molding methods, vapor pressure in a mold can be reduced at molding. By this, utility cost can be reduced, and additionally, molding cycle can be lowered, which leads to steep rise in preparation efficiency at internal molding.

For effectively manifesting the above-mentioned effect, the fusion ratio of a foamed article is 10 to 70%, preferably 10 to 60%, more preferably 20 to 50%. When the fusion ratio is less than 10%, the open cell ratio of a foamed article tends to increase over 12%, and adhesive force among pre-foamed particles giving the foamed article is too low, consequently, tensile strength decreases, and additionally, chemical resistance and physical properties such as strain recovering property after compression and water-resistance tend to be lowered. In a remarkable case, the resulting foamed article can not keep the same form as that of a mold, resulting in poor appearance.

The open cell ratio of a foamed article in the present invention is at most 12%, preferably at most 10%, more preferably at most 8%. The open cell ratio is usually an index representing closed condition in foamed structure giving a thermoplastic resin foamed article, and measured according to ASTM D2856 using a measuring apparatus called air pycnometer. This index is usually used for judging closed condition of cell structure of a thermoplastic resin foamed article, and a foamed article having a high open cell ratio is judged as low independency of cell structure.

In case of a foamed article obtained by heat-fusing a pre-foamed particle, the open cell ratio has not been used conventionally as an index representing physical property. This is mainly because the closed condition of cell structure of a pre-foamed particle itself and volume of space among pre-foamed particles can not be judged separately, due to a measuring principle of open cell ratio that a ratio of the closed space volume in a sample to the volume of the sample is measured after permeating lower pressure air into a foamed article which has been cut and surface area of which has been removed. Both when closed condition of cell structure is broken and when the volume of space among particles increases, the open cell ratio increases. In any case, in a foamed article of the present invention, when a open cell ratio is over 12%, compressive strength decreases and desired mechanical strength is not obtained.

The density of a foamed article of the present invention is 90 to 300 g/L, preferably 100 to 300 g/L, more preferably 110 to 300 g/L. In general, mechanical strength represented by compressive strength of a foamed article varies depending on the density of the foamed article. The higher a density is and the lower the foaming ratio is, the higher the mechanical strength of the foamed article becomes. While the higher a density is and the lower foaming ratio is, the more remarkable the reduction in compressive strength tends to reveal. When a density of a foamed article is less than 90 g/L, the compressive strength improving effect of the present invention decreases. When a density is more than 300 g/L, a foamed article having excellent physical property and an open cell ratio of at most 12% can not be obtained by the heat-fusion molding method.

An object of the present invention is to provide a foamed article of a polypropylene resin composition which has a high density and is excellent in compressive strength and tensile strength. Therefore, it is preferable that a tensile strength is 0.6 to 3.0 MPa, and a density x and a compressive strength y of a foamed article satisfy the following equation:

$$y - 0.013x + 0.645 \geq 0 \quad (1)$$

As described above, a compressive strength of a thermoplastic resin foamed article varies depending on a density of the foamed article, and the higher a density is, the higher a compressive strength is. Therefore, in evaluating compressive strength improving effect, constant density of a foamed article is a precondition, and when compressive strengths of foamed articles having different densities are compared, it is convenient to standardize density elements by the inequality as shown in formula (1).

A compressive strength of a foamed article having, as a base material resin, a crystalline resin represented by a polypropylene resin varies significantly by crystallization properties of the crystalline resin such as crystalinity, melting temperature, crystallization temperature and the like. And, when a resin composition comprising a hydrophilic polymer, and if necessary, a filler, pigment, dye, antistatic agent, antioxidant, light stabilizer, lubricant and the like as in the present invention is used, the compressive strength varies significantly depending on property and an amount of these additives. Further, as disclosed in the present invention, the compressive strength varies significantly also depending on an open cell ratio of a foamed article, and when the open cell ratio increases over 12%, improvement in the compressive strength is quite insufficient even if a density of the foamed article increases.

EXAMPLE

The present invention is explained in detail by using following examples, but the present invention is not limited thereto. "Part" and "%" mean "part by weight" and "% by weight", respectively, otherwise specified.

Examples 1 to 7 and Comparative Examples 1 to 3

To 100 parts of a random copolymer of ethylene and propylene (ethylene content: 3%, MI=6 g/10 minutes, melting temperature: 145° C.) were mixed 2 parts of an ethylene ionomer, as a hydrophilic polymer, which is obtained by converting a carboxyl group of a copolymer of ethylene and methacrylic acid into a salt with a sodium ion to crosslink the molecule, 0.3 part of a filler (talc, average particle size: 9.5 μm) and 1 part of carbon black. By using the resin composition a pellet was prepared (resin particle: 2 mg/particle) (melting temperature of this pellet was the same as that of the random copolymer of ethylene and propylene).

Then, a sealed vessel was charged with 100 parts of this pellet, 0.5 part of powdery calcium tertiary phosphate as a dispersing agent and 0.006 part of sodium n-paraffin sulfonate together with 300 parts of water. The mixture was heated to 153° C., and air was introduced into the sealed vessel to raise the pressure in the sealed vessel to a predetermined pressure. A bulb of the sealed vessel was opened while maintaining this pressure to release water dispersion substances (resin particle and aqueous dispersing agent) under atomspheric pressure, to obtain a pre-foamed particle comprising a polypropylene resin composition having each foaming ratio shown in Table 1.

By using the resulted pre-foamed particle having each foaming ratio, foamed articles of polypropylene resin composition were obtained in a cubic form of 320 mm×320 mm×60 mm having two kinds of densities of 115 g/L and 240 g/L, by the three kinds of known internal molding methods, a compression filling method, internal pressure imparting method and direct filling method. The open cell ratio, fusion ratio and compressive strength at 25% strain of the resulted foamed article of polypropylene resin composition, and the number of endothermic peak in a DSC curve of a pre-foamed particle giving the foamed article were measured, respectively. Results are shown in Table 1.

Herein, the density, the open cell ratio and the compressive strength of the foamed article were measured according to ASTM D1895, ASTM D2856 and ASTM D3575(25% strain), respectively. The fusion ratio of the foamed article is a ratio of the number of broken particles to the total number of particles, when a cut of about 5 to 10 mm depth was made on the surface of the foamed article with a knife and the like, the in-mold foaming article was broken by impact along this cut, and the broken surface was observed.

In Examples 1 to 5, the pre-foamed particle comprising the polypropylene resin composition having various foaming ratios was molded by various molding methods, to obtain a foamed articles of polypropylene resin composition each having a density of 115 g/L. The open cell ratio of the resulted foamed article was 2.9 to 5.5%, the fusion ratio thereof was 30 to 50%, and the compressive strength thereof was 1.05 to 1.20 MPa. An in-mold foaming article having a density of 115 g/L, a fusion ratio of 50% and an open cell ration of 17.8% was shown in Comparative Example 1, a compressive strength thereof was 0.90 MPa. It can be understood that compressive strength improving effect of at least 15%, and 33% at maximum is found in the foamed articles of the present invention.

Examples 6 and 7 show physical properties of a foamed article having a density of 240 g/L likewise prepared. Also in this case, compressive strength improving effect of about 30% is found as compared with the foamed article in Comparative Example 2 having an open cell ration of 19.1%.

In Comparative Example 3, a foamed article having an open cell ratio of 32.8% and a fusion ratio of 5% was prepared at a density of 240 g/L. This foamed article manifested quite insufficient adhesion between the pre-foamed particles and could not maintain the same form as that of the mold, to show poor appearance.

Comparative Example 4

A polypropylene resin pre-foamed particle having a foaming ratio of 7.0 times was obtained in the same manner as in Examples 1 to 7 and Comparative Examples 1 to 3 except that a hydrophilic polymer was not mixed with the resin composition, a carbon dioxide gas was used as an inorganic gas foaming agent, and that the heating temperature of a sealed vessel in preparing a pre-foamed particle was 150° C. A foamed article of a polypropylene resin having a density of 115 g/L, an open cell ratio of 18.4% and a fusion ratio of 5% was obtained by the compression filling method. The resulted foamed article had a compressive strength of 0.55 MPa and a tensile strength of 1.05 MPa.

The foamed article had quite lower mechanical strength and insufficient physical properties as compared with the compressive strengths and tensile strengths of the foamed articles having the same density as that of the present invention in the Examples 1 to 5.

The foamed article of the present invention is an in-mold foaming article having improved productivity and stable quality in internal molding simultaneously, a compressive strength and a tensile strength thereof at high density range is improved at the same time in an epoch making manner.

What is claimed is:

1. An in-mold foaming article of propylene resin composition having a density of 90 to 300 g/L and an open cell ratio of at most 12% obtained by molding a pre-foamed particle, wherein the pre-foamed particle comprises a resin composition containing (A) 100 parts by weight of polypropylene resin and (B) 0.01 to 20 parts by weight of a hydrophilic polymer as a base material resin, and water as a foaming agent, and the pre-foamed particle has at least two endothermic peaks in a DSC curve obtained in differential scanning calorimetry.

2. The in-mold foaming article of claim 1, wherein a fusion ratio is 10 to 70%.

3. The in-mold foaming article of claim 1, wherein a tensile strength is 0.6 to 3.0 Mpa, and a density x and a comprehensive strength y satisfy the following condition formula (1):

$$y - 0.013x + 0.645 \geq 0 \tag{1}$$

4. The in-mold foaming article of claim 2, wherein a tensile strength is 0.6 to 3.0 Mpa, and a density x and a compressive strength y satisfy the following condition formula (1):

TABLE 1

| | Pre-Foaming pressure (MPa) | Pre-foamed Particle Foaming ratio | Method of molding | Foamed article | | | | | | |
|---|---|---|---|---|---|---|---|---|---|---|
| | | | | Density (g/L) | Open cell ratio (%) | Fusion ratio (%) | Number of endothermic peak | Compressive strength x (MPa) | (y-0.013x + 0.645) | Tensile strength (MPa) |
| Ex. 1 | 2.5 | 7.0 | Compression filling molding method | 115 | 5.5 | 30 | 2 | 1.05 | 0.20 | 1.45 |
| Ex. 2 | 2.5 | 7.0 | Compression filling molding method | 115 | 5.2 | 50 | 2 | 1.05 | 0.20 | 1.45 |
| Ex. 3 | 2.7 | 8.0 | Compression filling molding method | 115 | 3.7 | 40 | 2 | 1.20 | 0.35 | 1.50 |
| Ex. 4 | 2.5 | 7.0 | Direct filling method | 115 | 2.9 | 50 | 2 | 1.10 | 0.25 | 1.50 |
| Ex. 5 | 1.4 | 5.3 | Internal pressure imparting method | 115 | 4.9 | 50 | 2 | 1.05 | 0.20 | 1.45 |
| Ex. 6 | 1.0 | 2.6 | Internal pressure imparting method | 240 | 6.4 | 30 | 2 | 3.30 | 0.825 | 2.00 |
| Ex. 7 | 1.0 | 2.6 | Internal pressure imparting method | 240 | 4.0 | 60 | 2 | 3.30 | 0.825 | 2.00 |
| Com. Ex. 1 | 2.8 | 6.6 | Compression filling molding method | 115 | 17.8 | 50 | 2 | 0.90 | −0.10 | 1.35 |
| Com. Ex. 2 | 2.2 | 2.6 | Direct filling method | 240 | 19.1 | 60 | 2 | 2.55 | −0.075 | 1.90 |
| Com. Ex. 3 | 2.1 | 2.4 | Direct filling method | 240 | 32.8 | 5 | 2 | — | — | — |
| Com. Ex. 4 | 3.0 | 7.0 | Compression filling molding method | 115 | 18.4 | 5 | 2 | 0.55 | −0.30 | 1.05 |

From the above-described results, excellent properties of a foamed article of polypropylene resin composition of the present invention is clear.

$$y - 0.013x + 0.645 \geq 0 \tag{1}$$

* * * * *